United States Patent [19]

Briesch

[11] Patent Number: 5,473,898
[45] Date of Patent: Dec. 12, 1995

[54] METHOD AND APPARATUS FOR WARMING A STEAM TURBINE IN A COMBINED CYCLE POWER PLANT

[75] Inventor: Michael S. Briesch, Orlando, Fla.

[73] Assignee: Westinghouse Electric Corporation, Pittsburgh, Pa.

[21] Appl. No.: 384,508

[22] Filed: Feb. 1, 1995

[51] Int. Cl.⁶ ....................................................... F01K 7/00
[52] U.S. Cl. ............................. 60/646; 60/39.182; 60/656
[58] Field of Search .............................. 60/646, 655, 656, 60/39.182

[56] References Cited

U.S. PATENT DOCUMENTS

| | | | |
|---|---|---|---|
| 4,282,708 | 8/1981 | Kuribayashi et al. | 60/646 |
| 4,519,207 | 5/1985 | Okabe et al. | 60/39.182 |
| 5,029,443 | 7/1991 | Häuser | 60/656 |

Primary Examiner—Ira S. Lazarus
Assistant Examiner—L. Heyman
Attorney, Agent, or Firm—M. G. Panian

[57] ABSTRACT

A combined cycle gas turbine power plant uses compressed air bleed from the gas turbine compressor discharge air as a source of warming air for the steam turbine at start-up by incorporating a bypass line from the compressor discharge to the steam chest. During this time period, the steam produced by the heat recovery steam generator is dumped to the condenser. After warming the steam turbine, the compressed air is directed to the heat recovery steam generator for discharge to atmosphere. Once the heat recovery steam generator is capable of generating steam at sufficient temperature and pressure for introduction into the steam turbine, a control valve in the bypass line is closed, thereby eliminating the warming air, and a control valve in the steam supply line from the heat recovery steam generator to the steam turbine is opened so that the steam turbine can be brought on line.

10 Claims, 3 Drawing Sheets

METHOD AND APPARATUS FOR WARMING A STEAM TURBINE IN A COMBINED CYCLE POWER PLANT

BACKGROUND OF THE INVENTION

The present invention relates to a combined cycle power plant. More specifically, the present invention relates to method and apparatus for warming a steam turbine in a combined cycle power plant prior to generating power in the steam turbine.

The low capital cost, short lead times and flexibility of gas turbine-based power plants make them particularly attractive to electrical utilities as a means for generating electrical power. Unfortunately, the inefficiency of a gas turbine standing alone, referred to as a simple cycle system, is relatively low compared to conventional fired boiler steam turbine systems.

Consequently, substantial effort has been expended in developing methods for recovering the energy available in the gas exhausting from a gas turbine. One of the most successful methods involves the transfer of heat from the hot exhaust gas to pressurized feed water in a heat recovery steam generator ("HRSG"). The HRSG generates steam that is expanded in a steam turbine, thereby producing additional rotating shaft power. Power plants employing such a heat recovery method are termed combined cycle power plants.

During start-up of the gas turbine, there is a relatively rapid increase in the flow rate of the hot gas exhausting from the gas turbine as it accelerates to operating speed. Thereafter, the exhaust gas flow rate remains relatively constant, except for the effect of compressor vane modulation. However, after the gas turbine reaches operating speed, the temperature of the exhaust gas gradually increases as the firing temperature of the gas turbine is increased up to the level required to produce the desired power output, which is typically the maximum continuous rated power output of the gas turbine. Generally, the firing temperature is increased as rapidly as possible given the constraints imposed on the rate of the temperature increase by the components in the gas turbine and the HRSG exposed to the flow of hot gas.

Although the hot exhaust gas from the gas turbine typically flows through the HRSG during the gas turbine start-up, a considerable period of time elapses before an initially cold HRSG is capable of generating steam at sufficient pressure and temperature—typically, at least approximately 1400 kPa (200 psi) and 370° C. (700° F.)—to initiate roll off and warming of the steam turbine rotor. Introducing low pressure, low temperature steam into the steam turbine could result in undesirable condensation within the steam turbine.

Traditionally, therefore, steam produced by the HRSG during start-up of the gas turbine is dumped to the condenser until such time as the HRSG is capable of generating steam at the appropriate pressure and temperature for introduction into the steam turbine. Unfortunately, this approach increases the time required to bring the steam turbine on line, since it delays warming of the steam turbine until the gas turbine has been operating for some time.

This situation is further complicated in a combined cycle power plant in which the gas turbine and steam turbine rotors are coupled to a common electrical generator. In such situations, the steam turbine rotor typically accelerates along with the gas turbine rotor. However, if no fluid is flowing through the steam turbine flow path because the HRSG is not yet producing steam at the appropriate conditions for introduction into the steam turbine, the rotation of the steam turbine rotor will result in overheating of the steam turbine blades due to heat up of the air trapped within the steam turbine flow path. Consequently, in such arrangements, the steam turbine flow path must be ventilated until the HRSG is generating steam that can be introduced into the steam turbine, thereby further complicating the start-up of the power plant.

It is, therefore, desirable to provide a simple and effective approach for rapidly warming a steam turbine during the start-up of the gas turbine and HRSG in a combined cycle power plant.

SUMMARY OF THE INVENTION

Accordingly, it is the general object of the current invention to provide a simple and effective approach for rapidly warming a steam turbine during the start-up of the gas turbine and HRSG in a combined cycle power plant.

Briefly, this object, as well as other objects of the current invention, is accomplished in a power plant comprising (i) a gas turbine, (ii) means for generating a flow of steam, and (iii) a steam turbine for expanding the flow of steam. The gas turbine has a compressor for producing compressed air, means for heating at least a first portion of the compressed air so as to produce a hot compressed gas, and a first turbine for expanding the hot compressed gas so as to produce shaft power and an expanded gas. The steam turbine has a flow path for directing the flow of steam through the steam turbine and a plurality of rotating blades and stationary vanes disposed in the steam flow path. The power plant also comprises means for warming the steam turbine prior to expanding the flow of steam therein by directing a second portion of the compressed air produced by the compressor through at least a portion of the steam flow path of the steam turbine.

DESCRIPTION OF THE PREFERRED EMBODIMENT

Figure 1:
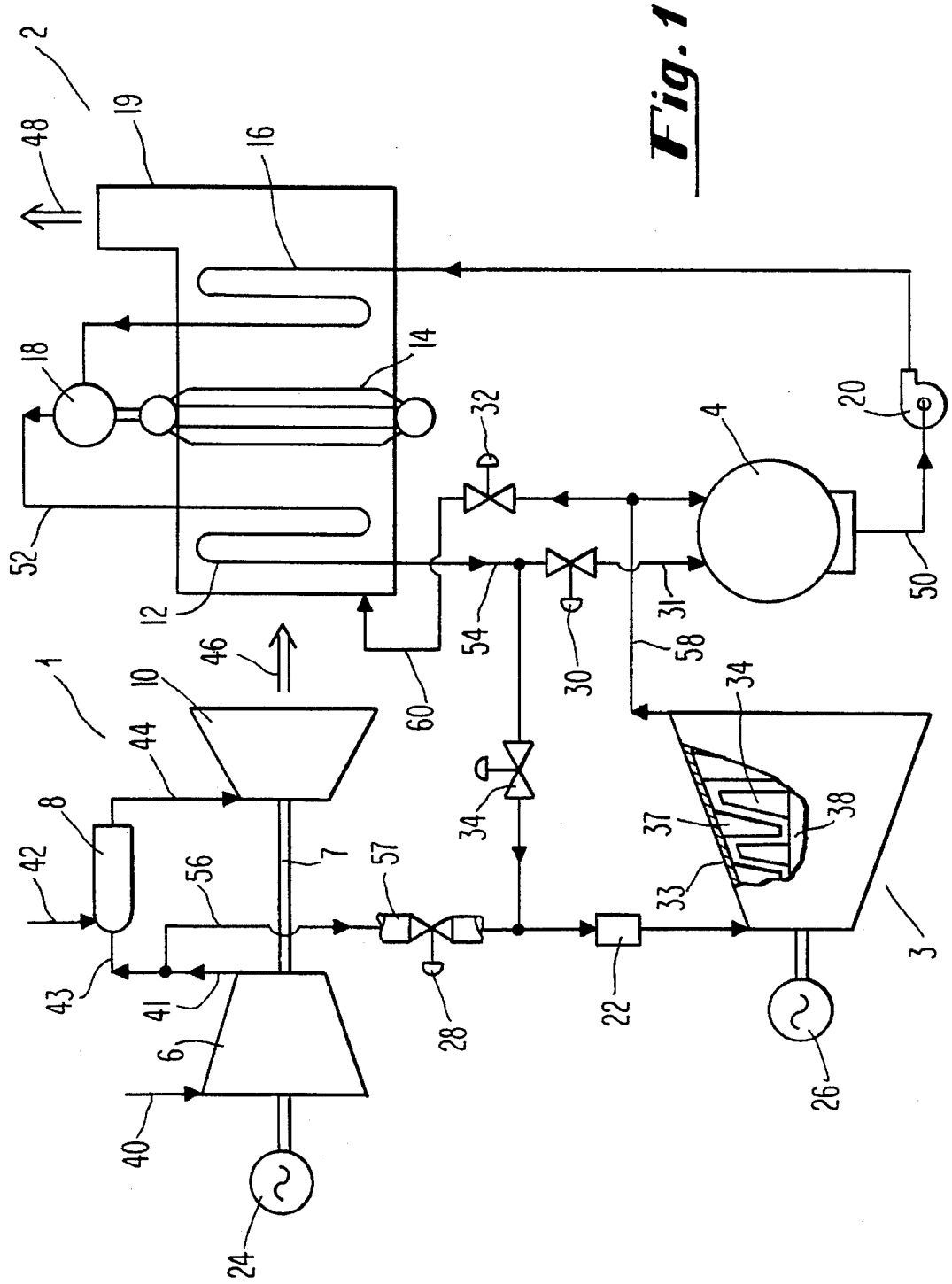
FIG. 1 is a schematic diagram of a combined cycle power plant according the current invention.

Referring to the drawings, there is shown in FIG. 1 a schematic diagram of a gas turbine power plant. The major components of the power plant include a gas turbine 1, a heat recovery steam generator 2 ("HRSG"), a steam turbine 3, and a condenser 4. The gas turbine 1 includes a compressor 6, a turbine 10 having a rotor shaft 7 connected to the compressor and to an electrical generator 24, and a combustor 8. The HRSG 2 includes a superheater 12, an evaporator 14, a steam drum 18, and an economizer 16. The steam turbine 3 includes a rotor 38 mounted for rotation within a casing 33 so as to form a flow path for the steam between themselves. As is conventional, a plurality of the rotating blades 34 and stationary vanes 37 project into the flow path.

In operation, the compressor 6 inducts ambient air 40 and compresses it, thereby producing compressed air 41. The temperature and pressure of the compressed air 41 produced by the compressor 6 will depend on the speed of the rotor 7 and the firing temperature of the hot gas 44 entering the turbine section 10, which determines the pressure ratio of the compressor. However, the temperature and pressure of the compressed air 41 will typically be in excess of 260° C. (500° F.) and 700 kPa (100 psi), respectively, when the gas turbine rotor 7 is at steady state operating speed, typically 3600 RPM.

A portion (not shown) of the compressed air 41 produced by the compressor 6 is typically directed to the turbine section 10 for cooling therein. During steady state operation of the power plant, the remainder 43 of the compressed air 41 produced by the compressor 6 is directed to the combustor 8, along with a fuel 42. However, according to the current invention, during start-up, a portion 56 of the compressed air 41 produced by the compressor 6 is used for warming the steam turbine 3, as discussed further below.

In the combustor 8, the fuel 42, which is typically natural gas or distillate oil, is introduced into the compressed air 43 via a nozzle (not shown). The fuel 42 burns in the compressed air, thereby producing a hot, compressed gas 44. The hot gas 44 is then directed to the turbine section 10. In the turbine section 10, the hot gas 44 is expanded, thereby producing power in the rotor shaft 7 that drives both the compressor portion of the rotor and the electrical generator 24. The expanded gas 46 is then exhausted from the turbine section 10. As a result of having been expanded in the turbine section 10, the temperature of the expanded gas 46 exhausting from the turbine section is considerably less than the temperature of the hot gas 44 entering the turbine section. Nevertheless, in a modern gas turbine operating at full load, the temperature of the expanded gas 46 is still relatively hot, typically in the range of 450°–600° C. (850–1100° F.).

From the turbine section 10, the expanded gas 46 is directed to the HRSG 2. In the HRSG 2, the expanded gas 46 is directed by ductwork so that it flows successively over the superheater 12, the evaporator 14 and the economizer 16. After flowing through the HRSG 2, the cooled, expanded gas 48 is then discharged to atmosphere via a stack 19. As is conventional, the superheater 12, the evaporator 14 and the economizer 16 may have heat transfer surfaces comprised of finned tubes. The expanded gas 46 flows over these finned tubes and the feed water/steam flows within the tubes. In the HRSG 2, the expanded gas 46 transfers a considerable portion of its heat to the feedwater/steam, thereby cooling the gas and transforming the feedwater into steam.

In addition to the expanded gas 46 from the gas turbine 1, the HRSG 2 receives a flow of feed water 50 from the condenser 4 that has been pressurized by pump 20. As is conventional, the feed water first flows through the heat transfer tubes of the economizer 16, where its temperature is raised to close to saturation temperature. The heated feedwater from the economizer 16 is then directed to the steam drum 18. From the steam drum 18, the water is circulated through the heat transfer tubes of the evaporator 14. Such circulation may be by natural means or by forced circulation. The evaporator 14 converts the feedwater into saturated steam 52. From the evaporator 14, the saturated steam 52 is directed to the superheater 12, wherein its temperature is raised into the superheat region.

From the superheater 12, the superheated steam 54 is directed to a steam chest 22 that distributes the steam to the inlet of steam turbine 3. In the steam turbine 3, the steam 54 flows through the flow path formed within the cylinder 33 and over the rows of rotating blades 34 and stationary vanes 37, only a few of which are shown in FIG. 1. In so doing, the steam 54 expands and generates shaft power that drives the rotor 38, which, in turn, drives a second electrical generator 26. Alternatively, the steam turbine rotor 38 and the gas turbine rotor 7 could be coupled to a common shaft that drives a single electrical generator. The expanded steam 58 exhausted from the steam turbine 3 is then directed to the condenser 4 and eventually returned to the HRSG 2.

The rate at which the feedwater 50 is converted to steam 52 in the HRSG 2—that is, the steam generation rate of the HRSG—is a function of the HRSG's heat transfer surface area and the operating pressure of the evaporator 14, as well as the temperature and flow rate of the expanded gas 46 from the gas turbine 1.

Figure 2:
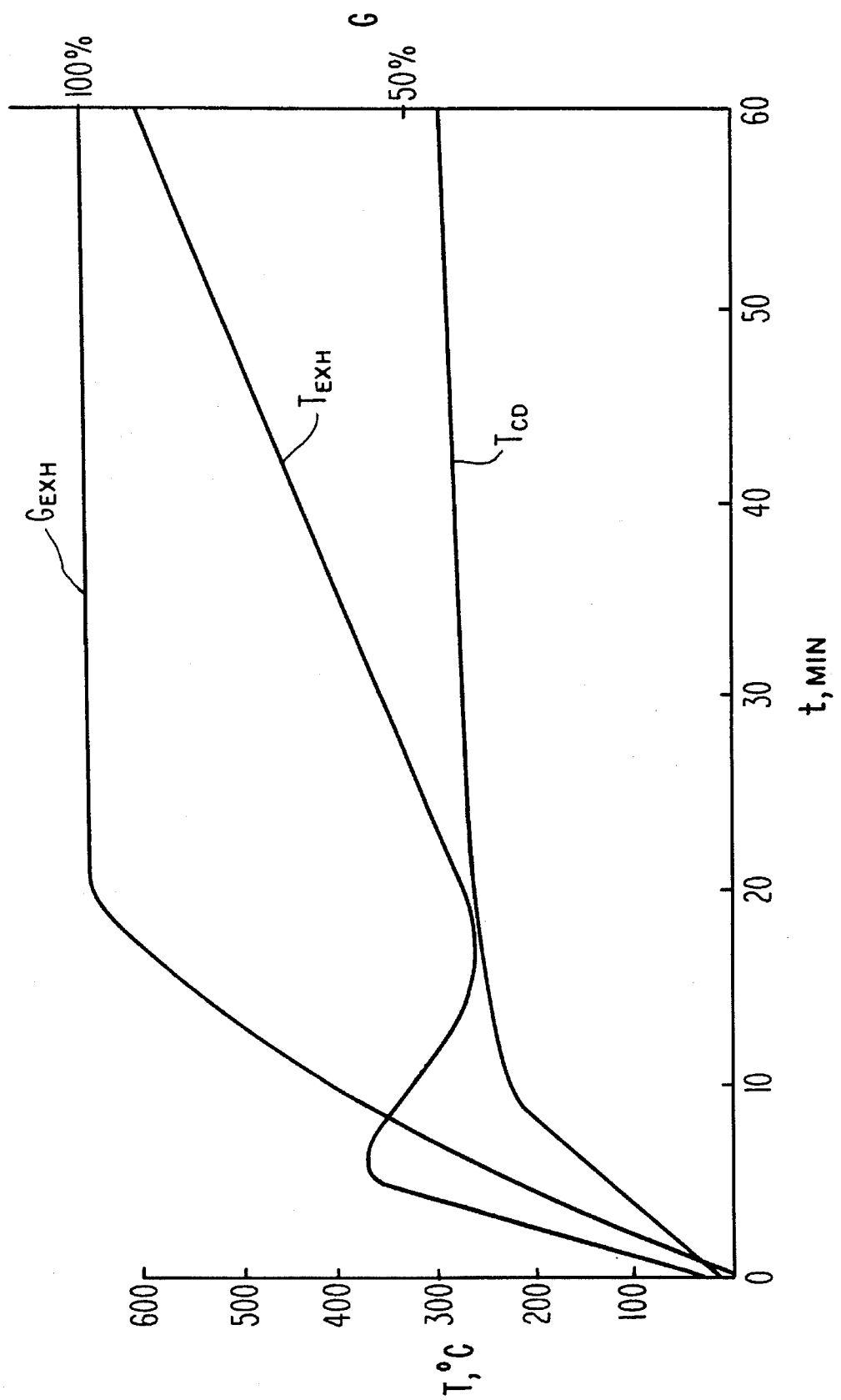
FIG. 2 is a graph showing the manner in which three gas turbine parameters vary with time during a typical gas turbine start-up—(i) the temperature of the gas exhausting from the gas turbine ($T_{EXH}$), in °C., (ii) the flow rate of the gas exhausting from the gas turbine ($G_{EXH}$), expressed as a percentage of the full speed flow rate, and (iii) the temperature of the compressed air discharging from the gas turbine compressor ($T_{CD}$), in °C.

The flow rate ($G_{EXH}$) and temperature ($T_{EXH}$) of the expanded gas 46 discharged from the gas turbine 1 as a function of time during a typical gas turbine start-up is shown in FIG. 2. The flow rate of the expanded gas 46 reaches its maximum value (i.e., 100%) about 20 minutes after start-up, when the gas turbine rotor 7 has reached its steady state operating speed, typically 3600 RPM. However, the temperature of the expanded gas 46 does not reach its maximum value of approximately 600° C. (1100° F.) until almost 60 minutes after start-up due to the constraint imposed upon the rate at which the temperature of the hot gas 44 entering the turbine 10 can be increased in order to avoid damaging the turbine components. If, as is typical, the minimum temperature for the steam entering the steam turbine 3 for warming purposes is approximately 370° C. (700° F.), then, at a minimum, warming steam could not be generated in the HRSG 2 until at least about 30 minutes after start-up of the gas turbine—that is, until the gas temperature (TEXH) exceeded 370° C. (700° F).

Figure 3:
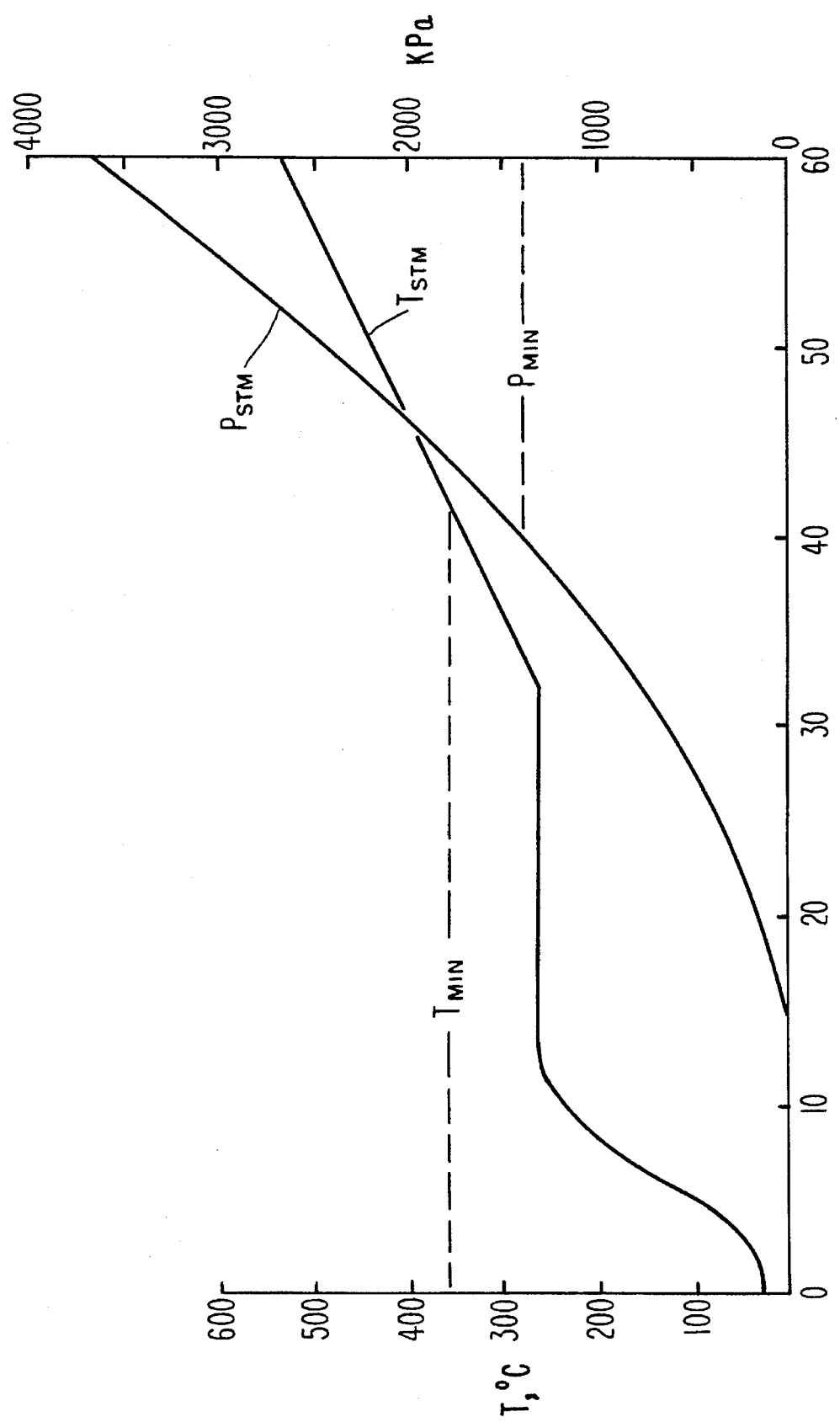
FIG. 3 is a graph showing the manner in which two heat recovery steam generator ("HRSG") parameters vary with time during a typical cold HRSG start-up—(i) the pressure of the steam produced by the HRSG ($P_{STM}$), in kPa, and (ii) the temperature of the steam produced by the HRSG ($T_{STM}$), in °C.

In addition to the time required for the expanded gas 46 to exceed the desired steam temperature is the fact that during a cold start-up of the HRSG 2, a considerable period of time must elapse before the HRSG is capable of generating warming steam due to the thermal mass of the steam generating system. Specifically, considerable time is required to heat the components within the HRSG 2 as well as the water within it, so that steam can be generated at sufficient pressure and temperature for warming the steam turbine 3. This phenomenon is shown in FIG. 3, which shows the manner in which the pressure ($P_{STM}$) and temperature ($T_{STM}$) of the steam 54 produced by the HRSG 2 vary with time during a typical cold HRSG start-up. As can be seen, the HRSG 2 does not generate steam at the minimum steam pressure ($P_{MIN}$) of 1400 Kpa (200 psi) and minimum steam temperature ($T_{STM}$) of 370° C. (700° F.) typically required for steam turbine warming until about 40 minutes after start-up of the gas turbine.

By contrast, as shown in FIG. 2, at only 10 minutes after start-up, the temperature ($T_{CD}$) of the compressed air 41 discharged from the compressor 6 is well in excess of 200° C. (360° F.), more than hot enough to warm the steam turbine 3. FIGS. 2 and 3 are intended as an example of the start-up characteristics of a power plant to which the current invention may be applied. However, it should be understood that the current invention is not limited to power plants having the specific start-up characteristics shown in these Figures.

Consequently, according to the current invention, during start-up of the gas turbine 1, a bleed pipe 57 is used to direct a portion 56 of the compressed air 41 produced by the compressor 6 to the steam chest 22. A flow control valve 34 in the main steam line from the HRSG 2 ensures that the warming air 56 is not directed to the HRSG during start-up. From the steam chest 22, the compressed air is introduced into the flow path within the steam turbine cylinder 33, where it initiates rotation of the rotor 38 and warms the steam turbine components. A flow control valve 28 in the bleed pipe 57 controls the introduction of warming air 56 to the steam turbine 3. A bypass line 60 connected to the steam turbine exhaust line, in conjunction with a flow control valve 32, directs the spent warming air 56 to the HRSG 2, from which it is eventually vented to atmosphere, rather than to the condenser 4. A flow control valve 30 in a steam dump line 31 allows the steam produced by the HRSG 2 to be dumped to the condenser 4 while the steam turbine 3 is being warmed by the compressed air 56.

The amount of compressed air 56 that must be bled to warm the steam turbine 3 is relatively small—i.e., 1–2% of the total compressed air 41 produced by the compressor 6. Although as shown in FIG. 1 the steam turbine warming air 56 is bled from the compressor discharge air 41, the warming air could also be obtained by bleeding compressed air from an intermediate stage of the compressor 6, in which case the temperature and pressure of the warming air would be somewhat lower than that associated with the use of compressor discharge air 41, depending on the specific stage within the compressor 6 from which the air was bled.

In combined cycle power plants in which the gas and steam turbines are coupled to a common shaft, the flow of compressed air 56 through the steam turbine 3 provides sufficient ventilation to prevent overheating of the turbine blades 34, thereby eliminating the need for a steam ventilation system.

When, as a result of heat transfer from the expanded gas 46 directed to the HRSG 2 from the gas turbine 1, the HRSG is finally capable of generating steam at sufficient pressure and temperature for introduction into the steam turbine 2, the control valve 34 in the main steam line is opened. In addition, the control valve 28 in the compressed air bleed pipe 57 and the control valve 30 in the steam dump line are closed so that steam from the HRSG 2 is introduced into the steam turbine 3, thereby allowing the acceleration to operating speed and the bringing on line of the steam turbine 3 to be completed. For the example shown in FIGS. 2 and 3, the current invention allows warming of the steam turbine 3 to begin less than 10 minutes after start-up of the gas turbine 1, rather than waiting the 40 minutes it takes for the HRSG 2 to produce warming steam. Thus, the total time required to bring the combined cycle power plant up to full load capacity is considerably reduced due to the early roll over and warming of the steam turbine 3 provided by current invention.

The present invention may be embodied in other specific forms without departing from the spirit or essential attributes thereof and, accordingly, reference should be made to the appended claims, rather than to the foregoing specification, as indicating the scope of the invention.

I claim:

1. A power plant, comprising:
    a) a gas turbine having a compressor for producing compressed air, means for heating at least a first portion of said compressed air so as to produce a hot compressed gas, and a first turbine for expanding said hot compressed gas so as to produce shaft power and an expanded gas;
    b) steam generating means for generating a flow of steam;
    c) a steam turbine for expanding said flow of steam from said steam generating means, said steam turbine having a flow path for directing said flow of steam through said steam turbine, a plurality of rotating blades and stationary vanes disposed in said steam flow path; and
    d) means for warming said steam turbine prior to expanding said flow of steam therein by directing a second portion of said compressed air produced by said compressor through at least a portion of said steam flow path of said steam turbine.

2. The power plant according to claim 1, wherein said means for warming said steam turbine comprises means for causing said flow of steam from said steam generating means to bypass said steam turbine while said second portion of said compressed air is being directed to said steam flow path.

3. The power plant according to claim 1, wherein said means for warming said steam turbine comprises a pipe for directing said second portion of said compressed air to said steam turbine.

4. The power plant according to claim 3, wherein said means for warming said steam turbine comprises a valve for controlling the flow rate of said second portion of said compressed air through said pipe.

5. The power plant according to claim 1, wherein said means for generating a flow of steam comprises means for transferring heat from said expanded gas produced by said first turbine to a flow of feed water.

6. The power plant according to claim 5, wherein said steam turbine warming means comprises means for venting said second portion of said compressed air from said steam turbine after said second portion of said compressed air has flowed through said steam turbine flow path.

7. The power plant according to claim 5, further comprising:
    a) a condenser for condensing said steam after said steam has been expanded in said steam turbine: and
    b) means for directing steam directly from said steam flow generating means to said condenser thereby bypassing said steam turbine when said steam turbine warming means is directing said second portion of said compressed air through said steam turbine flow path.

8. In a combined cycle power plant having (i) a gas turbine comprising a compressor for producing compressed air and a turbine for producing hot expanded gas, (ii) a heat recovery steam generator for generating a flow of steam by transferring heat from said hot expanded gas to a flow of feed water, and (iii) a steam turbine having a flow path for expanding said flow of steam generated by said heat recovery steam generator, a method of warming said steam turbine during starting of said combined cycle power plant, comprising the steps of:
    a) producing a flow of compressed air in said compressor;
    b) bleeding a portion of said compressed air from said compressor; and
    c) directing said portion of said compressed air through at least a portion of said steam turbine flow path during starting of said combined cycle power plant.

9. The method according to claim 8, further comprising the steps of:
    a) producing a flow of hot gas in said gas turbine;

b) generating a flow of steam in said heat recovery steam generator by transferring heat from said hot gas to a flow of feedwater; and c) diverting said flow of steam generated by said heat recovery steam generator from said steam turbine so that said flow of steam bypasses said steam turbine while said compressed air bled from said compressor is being directed to said steam flow path during starting of said combined cycle power plant.

10. The method according to claim 9, wherein the pressure of said steam generated by said heat recovery steam generator is below a predetermined value during a portion of said start-up of said combined cycle power plant, and further comprising the step of directing said compressed air bled from said compressor through said steam turbine flow path during said portion of said start-up of said combined cycle power plant.

\* \* \* \* \*